Dec. 22, 1970 D. R. SIVERTSEN 3,549,432

MULTILAYER MICROELECTRONIC CIRCUITRY TECHNIQUES

Filed July 15, 1968

INVENTOR

DAVID R. SIVERTSEN

ATTORNEY

United States Patent Office 3,549,432
Patented Dec. 22, 1970

3,549,432
MULTILAYER MICROELECTRONIC CIRCUITRY TECHNIQUES

David R. Sivertsen, Dallas, Tex., assignor to Texas Instruments Incorporated, Dallas, Tex., a corporation of Delaware Filed July 15, 1968, Ser. No. 744,983
Int. Cl. H01l 7/54
U.S. Cl. 148—175 15 Claims

ABSTRACT OF THE DISCLOSURE

A microelectronic circuit fabrication technique where an electron beam forms hillocks of single crystal material through a dielectric layer from a single crystal substrate. A single crystal is then grown atop each hillock over the dielectric layer by first epitaxially depositing material using the hillock as a nucleation site. The epitaxially deposited material is next expanded by means of a scanning electron beam into a broad area of single crystal material. This single crystal may be patterned to form component sites. Multilayer structures are formed by covering each previous dielectric layer and component sites with a subsequent dielectric layer and repeating the process of single crystal growth using extensions of the hillocks as nucleation sites.

Figure 1:
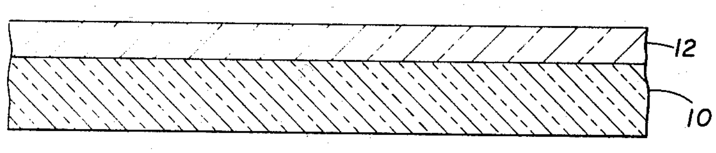
Figure 2:
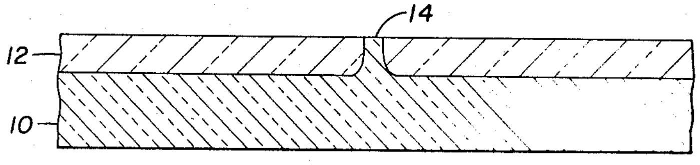

This invention relates to a microelectronic circuit fabrication technique, and more particularly to multilayer microelectronic circuitry fabricated by means of electron beam energy.

In the patent application of Olin B. Cecil, filed Jan. 3, 1966, Ser. No. 518,099, now U.S. Pat. No. 3,453,723, and assigned to the assignee of the present invention, there is described a technique for electron beam formation of protuberances or hills on monocrystalline semiconductor material in which circuit components are subsequently fabricated. The technique described employs a high energy beam of electrons directed at a single crystal wafer substrate. By pulsing the electron beam in a predetermined program over the area of the wafer, a plurality of protuberances or hills of single crystalline material are produced at desired locations and having given dimensions. Typically, the voltage of the high energy beam is approximately 100 kev. with a beam current at slightly less than 5 microamps; the pulse frequency is approximately 250 Hz.

Heretofore, various semiconductor devices, such as tarnsistors, diodes, and resistors, were formed in these protuberances or hills, or in areas outlined by electron beam cutting techniques. That is, in addition to the usual manner of processing by means of photomasks and chemical etching. By any one, or a combination of these techniques, a planar integrated circuit could be fabricated. However, because of alignment difficulties, especially with the photomask and etch technique, it was difficult if not impossible to fabricate multilayer circuitry.

Although the electron beam technique described in the above copending application produced relatively pure single crystal component sites, other techniques of planar integrated circuit fabrication produced component sites which often contain unwanted impurities. These impurities often adversely affected device operation. Further, the photomask and chemical etching processes are not conducive to reliably producing a high concentration of circuit components.

To produce a large number of highly concentrated reliable component elements on a wafer, it is an object of this invention to provide a multilayer microelectronic circuit. Another object of this invention is to provide microelectronic circuitry fabricated by means of an electron beam along with other processing techniques. A further object of this invention is to provide microelectronic circuitry in a three dimensional stacked configuration. Still another object of this invention is to provide microelectronic circuitry having relatively pure single crystal component sites.

In accordance with the present invention, a microelectronic circuit will be fabricated from a wafer of single crystal substrate covered with a dielectric or insulating layer. An energy beam directed to the wafer vaporizes a hole in the dielectric layer and forms a hillock on the substrate through the vaporized opening. A single crystal component site is grown on top of the dielectric layer by means of a scanning energy beam using the hillock as a nucleating site. Subsequent layers of oxide and subsequent layers of component sites are also formed by the energy beam vaporizing holes in the dielectric layer and extending the original hillock.

A more complete understanding of the invention and its advantages will be apparent from the specification and claims and from the accompanying drawings illustrative of the invention.

Referring to the drawings:

FIGS. 1 through 7 are sectional views, dimensionally exaggerated, of a wafer illustrating the subsequent steps for the fabrication of multilayer microelectronic circuitry.

To achieve multilayer microelectronic circuitry as the end product, a combination of electron beam, ion beam and chemical reaction techniques may be employed. Other combinations of focused energy sources and conventional semiconductor technology (such as furnace type fusion) may be employed to achieve the desired result. The invention, however, will be described with particular emphasis on electron beam techniques for producing the various component layers.

The starting material is a single crystal substrate 10, such as silicon, covered with a dielectric or insulating layer 12, such as silicon dioxide. While the description of this invention will be centered about silicon as the base material, other materials such as germanium and gallium arsenide as well as other semiconductors in Groups II–VI and III–V of the Periodic Table, may also be employed. Although the substrate 10 may be any semiconductor material, as well as any initial resistivity, the invention will be described making reference to a single crystal of low resistivity N+ silicon covered with a silicon dioxide layer 12, having a thickness on the order of 5,000 A. Further, while only one component site has been illustrated in the figures, it should be understood that a given wafer may contain dozens or even hundreds of component sites with each component site made up of any one or combinations of transistors, diodes, and other circuit components.

Electron beam apparatus as used in the fabrication of microelectronic circuitry has been thoroughly described in the above-mentioned patent application, Ser. No. 518,099, and in many U.S. patents, such as 3,340,601, and a detailed description is not deemed necessary. In an electron beam generator, a stream of high energy electrons is emitted by a heated cathode which connects to a source of heating current. The electrons emitted by the cathode of an electron generator are caused to be accelerated toward the substrate 10 by a negative DC acceleration voltage applied between the cathode and a grounded anode. In the usual manner, the accelerated electrons may be focused into a beam and controlled in a particular pattern by means of sets of deflector plates. Typically, the cathode emits electrons in pulses having a time duration of from 5 to 25 microseconds at a frequency of approximately 250 pulses per second. The energy of the beam as it strikes the substrate 10 is on the order of from 0.5 to 1.0 milliwatts/cm.$^2$. As has been demonstrated in many documented experiments, an electron beam can be positioned with an accuracy of approximately 5 microns. Thus, electron beam fabrication of microelectronic circuitry has a definite accuracy advantage over the standard photomask and chemical etching techniques.

Two of the many advantages of electron beam techniques for the fabrication of microelectronic circuitry is the extremely narrow fusion zone of the beam, and the controllability of the beam location. Fusion zones of the desired shape and located in a predetermined spatial relationship may be produced with an electron beam within extremely small tolerances. In the present invention, the electron beam is pulsed across the surface of the dielectric layer 12 in a predetermined configuration at an energy level just below that required for vaporizing the single crystal substrate 10. Although having insufficient energy to vaporize the substrate 10, the energy beam does have sufficient energy to vaporize a hole in the dielectric layer 12. As a result, a plurality of hillocks, such as hillock 14 of FIG. 2, of single crystalline silicon material are formed upon the substrate 10 through the dielectric layer 12. Note, that the hillock 14 is not formed by cutting or etching notches into the substrate 10, but raher by a material expansion above the original surface of the substrate. Laboratory investigation of hillocks formed in this manner have proven that there is a volumetric expansion of the substrate 10.

Figure 3:
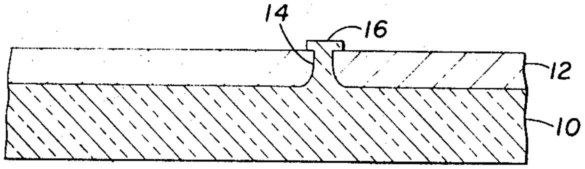

After the hillock 14 has been formed on the substrate 10, a small area of single crystal material 16 is epitaxially formed over the dielectric layer 12 using the hillock as nucleating site. As mentioned previously, other processes besides electron beam techniques may be used in the complete fabrication of multilayer microelectronic circuitry. In the case of the crystal 16, a standard gas-phase reaction may be employed to form a single crystal upon the single crystal hillock 14 such that the lattice structure of the resulting layer is an exact extension of the subtsrate crystal structure. As shown in FIG. 3, there now exists two layers of single crystal material which may be used as a site for the formation of transistors or other semiconductor devices. These layers may be interconnected or, by removing the hillock 14, electrically isolated to form independent circuitry.

Figure 4:
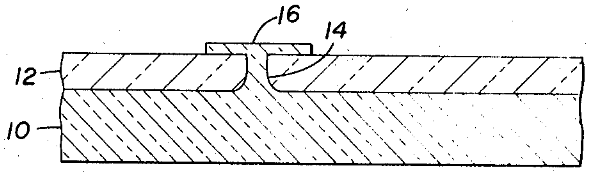
Figure 5:
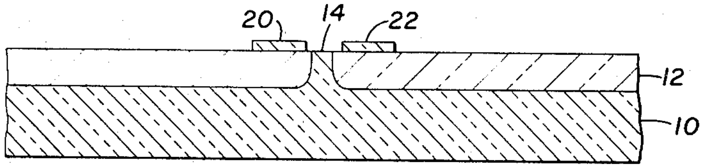

If desired, the area of the crystal 16 can be expanded by means of a scanning electron beam that actually "grows" the silicon into an area greater than could be achieved by epitaxial deposition of the silicon alone. This is illustrated in FIG. 4 where the crystal 16 has been expanded over the dielectric layer 12 by means of a scanning electron beam 18, shown schematically. The growth of the silicon can be accomplished by using a scanning beam by itself, or in combination with a chemical vapor atmosphere of epitaxial vapor (such as trichlorosilane). This expanded area may be used as a component site for the formation of semiconductor devices by photomasking and diffusion of doped regions. Preferably, the region 16 will be divided into several component sites, such as 20 and 22, by means of a photomask and chemcial etch to isolate these sites from the hillock 14.

Figure 6:
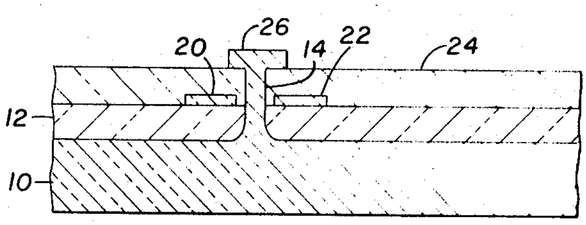

To form additional layers of circuitry, the dielectric layer 12 and the component sites 20 and 22 are covered with a second dielectric layer 24, as shown in FIG. 6, by any of the standard oxide formation techniques. This second dielectric layer 24 is deposited to a depth on the order of microns. A repeat of the steps of forming a hole in the dielectric layer and extending the hillock 14 will now be carried out. Directing the high energy electron beam to the dielectric layer 24 in the area of the hillock 14 vaporizes a hole in the dielectric layer and causes a further expansion of the substrate material 10, thereby increasing the height of the hillock 14. Subsequently, a crystal 26 is epitaxially deposited on the dielectric layer 24, again using the hillock 14 as a nucleation site. This crystal is expanded by means of a scanning electron beam and patterned by a photomask and etch technique.

Through laboratory experiments, it has been shown that by the proper selection of beam energy parameters a hillock may be grown to a height of several mils. Since the thickness of the dielectric layers 12 and 24 is on the order of microns, the above described processes may be repeated to form microelectronic circuitry on a number of layers and at preselected locations either lying on or sandwiched between material of dielectric composition. These circuitry layers may be interconnected by means of a hillock or electrically independent. Where desirable, a hillock may be removed after completion of the circuitry layers by an electron beam having an energy level sufficient to vaporize the hillock.

Figure 7:
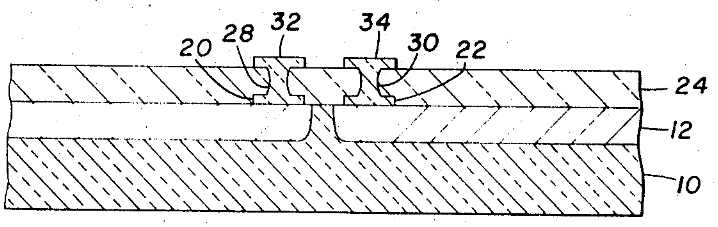

In addition to extending the hillock 14 through subsequent layers of dielectric material, the energy beam may be directed at the component sites 20 and 22 thus forming hillocks 28 and 30, as shown in FIG. 7, for additional nucleating sites at the surface of the dielectric layer 24. Hillocks such as 28 and 30 are of particular importance when the circuitry on the component sites 20 and 22 is to be interconnected to component sites on the dielectric layer 24. In accordance with steps previously described, regions 32 and 34 of single crystal material may be epitaxially deposited on the dielectric layer 24 using the hillocks 28 and 30 as nucleation sites. These single crystal areas may be expanded by using either a scanning energy beam by itself or in combination with a chemical atmosphere or epitaxial vapor (such as dry trichlorosilane). A combination of effects can be achieved by using electron beam technology alone or in combination with photomask and chemical etch techniques as adequately emphasized previously.

Very precise patterns of hillocks and component sites may be formed by the techniques described herein which are not only simpler but also enable a higher degree of microminiaturization than that previously obtainable by photographic masking and etching techniques. Although particular emphasis has been placed on the use of electron beams, it is also contemplated that other concentrated sources of energy, such as a laser, may be utilized in like manner to form the plurality of hillocks of single crystalline material. For silicon substrates, the dielectric layer may be a silicon nitride or a silicon carbide in addition to a silicon dioxide.

While several embodiments of the invention, together with modifications thereof, have been described in detail herein and illustrated in the accompanying drawings, it will be evident that various futher modifications are possible without departing from the scope of the invention.

What is claimed is:

1. A method of fabricating a microelectronic circuit from a single crystal with a dielectric overlay comprising:

vaporizing a hole in said dielectric layer by means of an energy beam, producing a hillock on the surface of said single crystal through the hole in said dielectric layer by means of an energy beam, and forming a single crystal layer over the dielectric layer using said hillock as a nucleating site.

2. A method of fabricating a microelectronic circuit from a single crystal as set forth in claim 1 including the step of patterning said single crystal layer to define component sites.

3. A method of fabricating a microelectronic circuit from a single crystal as set forth in claim 1 wherein the single crystal layer is formed by epitaxially depositing a single crystal on said hillock.

4. A method of fabricating a microelectronic circuit from a single crystal as set forth in claim 3 including expanding the single crystal layer by a scanning energy beam.

5. A method of fabricating a microelectronic circuit from a single crystal as set forth in claim 4 wherein an electron beam vaporizes a hole in said dielectric layer, produces said hillock, and expands said single crystal.

6. A method of fabricating a multilayer microelectronic circuit from a single crystal substrate having a dielectric overlay comprising:

vaporizing a hole in said dielectric layer by means of an energy beam, producing a hillock on the surface of said single crystal through the hole in said dielectric layer by means of an energy beam, forming a single crystal layer over the dielectric layer with said hillock as a nucleating site, patterning said single crystal layer to outline component sites, and forming additional layers of component sites over a dielectric layer covering said preceding component layers by extending said hillock and forming additional single crystals.

7. A method of fabricating a multilayer microelectronic circuit from a single crystal substrate as set forth in claim 6 wherein the formation of each additional component layer includes:

depositing a dielectric layer over the preceding dielectric layer and component sites, vaporizing a hole in said dielectric layer by means of an energy beam, extending said hillock through the vaporized hole in said dielectric layer by means of an energy beam, forming a single crystal layer over the dielectric layer with the extended hillock as a nucleating site, and patterning said single crystal layer to outline additional component sites.

8. A method of fabricating a multilayer microelectronic circuit from a single crystal substrate as set forth in claim 7 wherein the single crystal layer is formed by epitaxially depositing a single crystal on said hillock.

9. A method of fabricating a multilayer microelectronic circuit from a single crystal substrate as set forth in claim 8 including expanding the single crystal layer by a scanning energy beam.

10. A method of fabricating a multilayer microelectronic circuit from a single crystal substrate as set forth in claim 9 wherein an electron beam vaporizes the holes in said dielectric layers, produces and extends said hillocks, and expands said single crystal from said epitaxial deposits.

11. A method of fabricating a multilayer microelectronic circuit from a single crystal substrate with a dielectric overlay comprising:

directing a beam of energy to different areas in a pattern to vaporize holes in said dielectric layer and produce a plurality of hillocks on the surface of said single crystal through said vaporized holes, epitaxially depositing a single crystal at each of said hillocks over said dielectric layer, scanning an energy beam around each of said epitaxially deposited crystals to expand the single crystal over the dielectric layer at each of said hillocks, patterning said expanded crystals to outline component sites, and forming additional layers of component sites over a dielectric layer covering said preceding component layers by extending said hillocks through said subsequent dielectric layers.

12. A method of fabricating a multilayer microelectronic circuit from a single crystal substrate as set forth in claim 11 wherein said subsequent dielectric layers and component sites are formed by:

depositing a dielectric layer over the preceding dielectric layer and component sites, directing a beam of energy to the dielectric layer to vaporize holes therein and form hillocks from said expanded single crystals, and forming a single crystal layer over the dielectric layer using each of said hillocks as a nucleating site.

13. A method of fabricating a multilayer microelectronic circuit from a single crystal substrate as set forth in claim 12 including the step of depositing a dopant in selected areas of said component sites at selected active regions, and diffusing said dopant into said single crystal component sites.

14. A method of fabricating a multilayer microelectronic circuit from a single crystal substrate as set forth in claim 12 wherein an electron beam produces holes in the dielectric layers, forms and extends said hillocks, and expands said single crystal component sites.

15. A method of fabricating a multilayer microelectronic circuit from a single crystal substrate as set forth in claim 14 wherein said single crystal component sites are formed by a scanning electron beam in combination with a chemical atmosphere of epitaxial vapor.

References Cited

UNITED STATES PATENTS 3,453,723 7/1969 Cecil --------------- 148—1.5

L. DEWAYNE RUTLEDGE, Primary Examiner

R. A. LESTER, Assistant Examiner

U.S. Cl. X.R.

29—577; 117—93.3; 148—1.5, 174